(12) United States Patent
Tsumagari

(10) Patent No.: US 8,476,781 B2
(45) Date of Patent: Jul. 2, 2013

(54) ROTATING ELECTRIC MACHINE, WIND POWER GENERATION SYSTEM AND METHOD OF MANUFACTURING ROTATING ELECTRIC MACHINE

(75) Inventor: Hiroshi Tsumagari, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 274 days.

(21) Appl. No.: 13/033,611

(22) Filed: Feb. 24, 2011

(65) Prior Publication Data
US 2012/0038166 A1 Feb. 16, 2012

(30) Foreign Application Priority Data
Aug. 10, 2010 (JP) ................... 2010-179329

(51) Int. Cl.
*F03D 9/00* (2006.01)
(52) U.S. Cl.
USPC .............................. 290/44; 290/55
(58) Field of Classification Search
USPC ...................................... 290/44, 55
See application file for complete search history.

(56) References Cited

U.S. PATENT DOCUMENTS

| 5,811,902 | A | 9/1998 | Sato | |
|---|---|---|---|---|
| 7,547,985 | B2 * | 6/2009 | Takaichi et al. | 290/55 |
| 2004/0149750 | A1 | 8/2004 | Kim | |
| 2004/0212262 | A1 | 10/2004 | Chiu et al. | |
| 2006/0045774 | A1 | 3/2006 | Lu et al. | |
| 2006/0131973 | A1 | 6/2006 | Chiu et al. | |
| 2008/0137811 | A1 * | 6/2008 | Gadre et al. | 378/123 |

FOREIGN PATENT DOCUMENTS

| EP | 1435684 | 7/2004 |
|---|---|---|
| JP | 2005-057915 | 3/2005 |
| JP | 2006-006023 | 1/2006 |
| JP | 2007-024294 | 2/2007 |

OTHER PUBLICATIONS

Extended European Search Report for corresponding EP Application No. 11155644.5-2207, May 31, 2012.
Notification of Reason(s) for Rejection for corresponding Japanese Application No. JP2010-179329, Nov. 30, 2010.

\* cited by examiner

*Primary Examiner* — Tho D Ta
(74) *Attorney, Agent, or Firm* — Ditthavong Mori & Steiner, P.C.

(57) ABSTRACT

This rotating electric machine is so formed that the length from an end portion of a rotor core closer to a rotating shaft support portion to a portion first coming into contact with the rotating shaft support portion when a rotating shaft portion is inserted into the rotating shaft support portion is larger than the length from an end portion of the rotating shaft support portion closer to a stator to an end portion of a stator core opposite to the rotating shaft support portion.

20 Claims, 8 Drawing Sheets

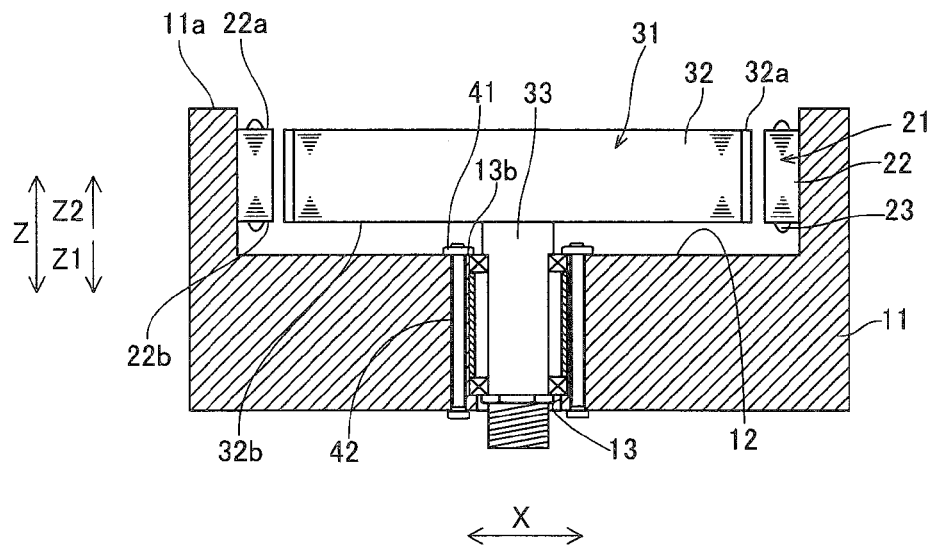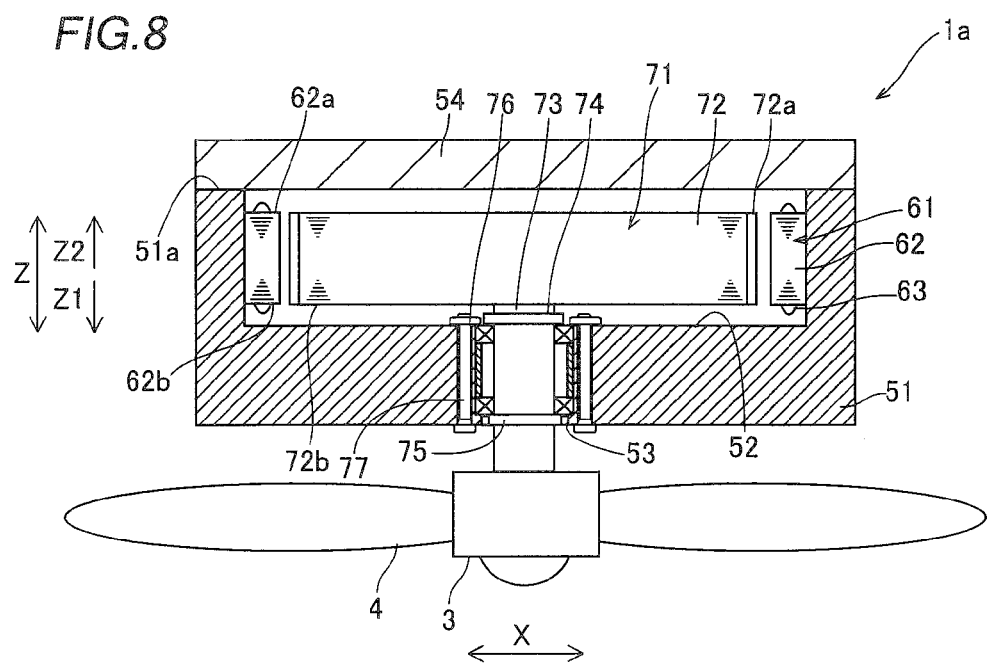

ROTATING ELECTRIC MACHINE, WIND POWER GENERATION SYSTEM AND METHOD OF MANUFACTURING ROTATING ELECTRIC MACHINE

CROSS-REFERENCE TO RELATED APPLICATION

The priority application number JP2010-179329, Rotating Electric Machine, Wind Power Generation system and Method of Manufacturing Rotating Electric Machine, Aug. 10, 2010, Hiroshi Tsumagari, upon which this patent application is based is hereby incorporated by reference.

BACKGROUND OF THE INVENTION

1. Field of the Invention

The present invention relates to a rotating electric machine, a wind power generation system and a method of manufacturing a rotating electric machine.

2. Description of the Background Art

In general, Japanese Patent Laying-Open No. 2006-6023, for example, discloses a rotating electric machine including a rotor and a stator radially opposed to the rotor.

The aforementioned Japanese Patent Laying-Open No. 2006-6023 discloses a power generator (rotating electric machine) including a rotor, a stator radially opposed to the rotor, a housing storing the rotor and the stator, and a rotating shaft connected to the rotor and rotatably supported by the housing through a pair of bearings. In this power generator, a permanent magnet is provided on the outer periphery of the rotor. The rotor and the stator are so arranged that the permanent magnet of the rotor and a stator core on which a winding of the stator is wound are radially opposed to each other. In the power generator disclosed in the aforementioned Japanese Patent Laying-Open No. 2006-6023, the length of a portion of the rotating shaft projecting from the rotor is relatively small.

SUMMARY OF THE INVENTION

A rotating electric machine according to a first aspect of the present invention includes a rotating shaft portion, a rotor including a rotor core connected to the rotating shaft portion, a stator including a stator core arranged to be radially opposed to the rotor core, a housing provided with a recess portion storing the rotor and the stator and a rotating shaft support portion provided on the housing for rotatably supporting the rotating shaft portion, and is so formed that the length in the extensional direction of the rotating shaft portion from an end portion of the rotor core closer to the rotating shaft support portion to a portion first coming into contact with the rotating shaft support portion when the rotating shaft portion is inserted into the rotating shaft support portion is larger than the length in the extensional direction of the rotating shaft portion from an end portion of the rotating shaft support portion closer to the stator to an end portion of the stator core opposite to the rotating shaft support portion.

A wind power generation system according to a second aspect of the present invention includes a power generator provided with a rotating shaft portion, a rotor including a rotor core connected to the rotating shaft portion, a stator including a stator core arranged to be radially opposed to the rotor core, a housing provided with a recess portion storing the rotor and the stator and a rotating shaft support portion provided on the housing for rotatably supporting the rotating shaft portion, and a blade connected to the rotating shaft portion, and is so formed that the length in the extensional direction of the rotating shaft portion from an end portion of the rotor core closer to the rotating shaft support portion to a portion first coming into contact with the rotating shaft support portion when the rotating shaft portion is inserted into the rotating shaft support portion is larger than the length in the extensional direction of the rotating shaft portion from an end portion of the rotating shaft support portion closer to the stator to an end portion of the stator core opposite to the rotating shaft support portion.

A method of manufacturing a rotating electric machine according to a third aspect of the present invention is a method of manufacturing a rotating electric machine including a rotating shaft portion, a rotor including a rotor core connected to the rotating shaft portion, a stator including a stator core arranged to be radially opposed to the rotor core, a housing provided with a recess portion storing the rotor and the stator and a rotating shaft support portion provided on the housing for rotatably supporting the rotating shaft portion, and includes the steps of bringing the rotating shaft portion and an end portion of the rotating shaft support portion closer to the stator into contact with each other in a state where the rotor core and the stator core are not radially opposed to each other by rendering the length in the extensional direction of the rotating shaft portion from an end portion of the rotor core closer to the rotating shaft support portion to a portion first coming into contact with the rotating shaft support portion when the rotating shaft portion is inserted into the rotating shaft support portion larger than the length in the extensional direction of the rotating shaft portion from the end portion of the rotating shaft support portion closer to the stator to an end portion of the stator core opposite to the rotating shaft support portion, and inserting the rotating shaft portion into the rotating shaft support portion while keeping a state where the rotor core and the stator core are not in contact with each other.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 illustrates a state where the rotor of the power generator according to the first embodiment of the present invention is mounted on the housing;

FIG. 8 is a sectional view of a power generator according to a second embodiment of the present invention;

DESCRIPTION OF THE PREFERRED EMBODIMENTS

Embodiments of the present invention are now described with reference to the drawings.

First Embodiment

First, the structure of a wind power generation system 100 according to a first embodiment of the present invention is described with reference to FIGS. 1 to 4. According to the first embodiment, the inventive rotating electric machine employed for the wind power generation system 100 is applied to a power generator 1.

Figure 1:
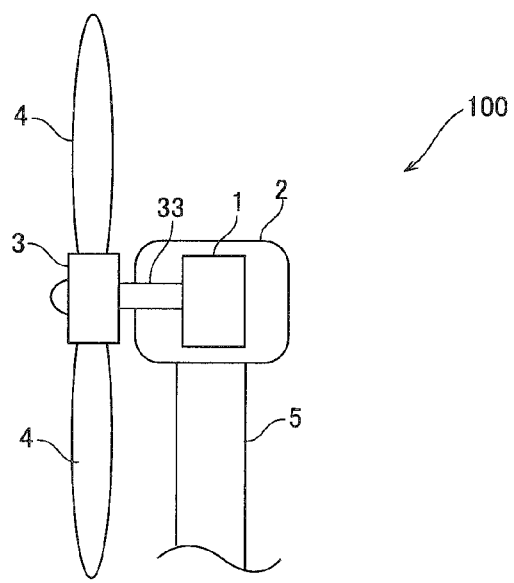
FIG. 1 illustrates the overall system of a wind power generation system according to a first embodiment of the present invention.

As shown in FIG. 1, the wind power generation system 100 is constituted of the power generator 1, a nacelle 2 for storing the power generator 1, a rotor hub 3, a plurality of blades 4 and a tower 5. The power generator 1 is stored in the nacelle 2. The rotor hub 3 is mounted on a rotating shaft 33, described later, of the power generator 1. The plurality of blades 4 are mounted on the rotor hub 3. The nacelle 2 is mounted on the tower (supporting column) 5.

Figure 4:
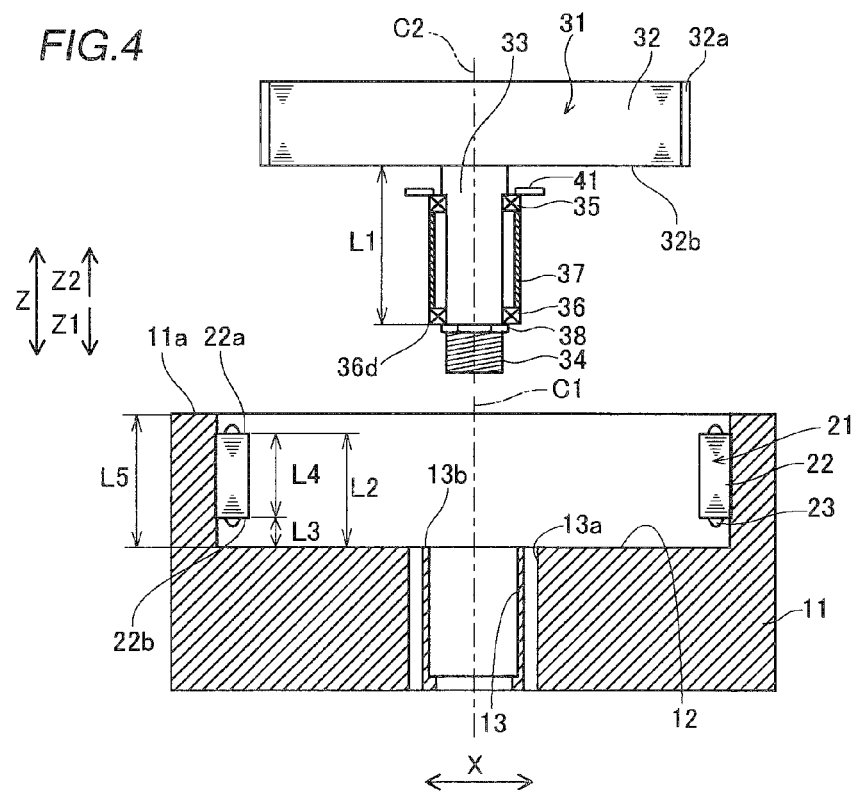
FIG. 4 illustrates a state before a rotor of the power generator according to the first embodiment of the present invention is mounted on a housing.

As shown in FIG. 4, the power generator 1 is constituted of a housing 11, a stator 21 and a rotor 31. The housing 11 is in the shape of a column. Further, the housing 11 is provided with a recess portion 12 storing the stator 21 and the rotor 31. The recess portion 12 of the housing 11 is provided with a rotating shaft support hole 13 for receiving the rotating shaft 33 of the rotor 31. The recess portion 12 of the housing 11 is further provided with screw receiving holes 13$a$ consisting of through-holes for receiving screws 42 described later. A lid portion 14 (see FIG. 2) is provided to cover the recess portion 12 of the housing 11. The rotating shaft support hole 13 is an example of the "rotating shaft support portion" or the "first rotating shaft support hole" in the present invention.

The stator 21 is constituted of a stator core 22 and a winding assembly 23. The stator core 22 is formed by a silicon steel lamination, for example. Further, the stator core 22 is provided with a plurality of slots (not shown). The winding assembly 23 is stored in the slots of the stator core 22. The winding assembly 23 is constituted of a plurality of windings capable of passing three-phase currents of U-, V- and W-phases, for example.

The rotor 31 includes a rotor core 32 and the rotating shaft 33. The rotor core 32 is in the shape of a flat column, and connected to the rotating shaft 33. The rotating shaft 33 is provided to project and extend only on the side of the rotor core 32 closer to the rotating shaft support hole 13 (along arrow Z1) of the stator 21. Thus, according to the first embodiment, the rotating shaft support hole 13 of the stator 21 rotatably supports the rotating shaft 33 in a cantilever manner. The rotor core 32 is formed by a silicon steel lamination, for example, and has a permanent magnet 32$a$ provided on the outer peripheral portion thereof. A screw portion 34 for meshing with a bearing nut 38, described later, is provided on the forward end side (along arrow Z1) of the rotating shaft 33. The rotating shaft 33 is an example of the "rotating shaft portion" or the "first rotating shaft" in the present invention.

Figure 3:
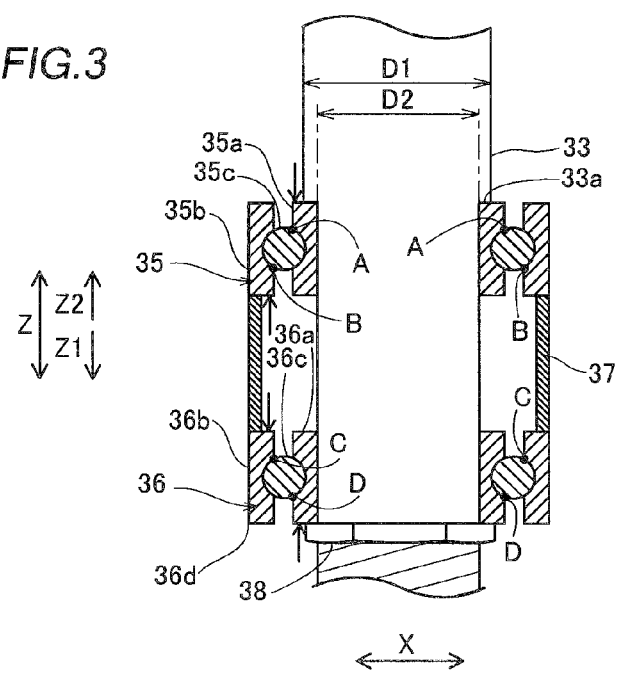
FIG. 3 is a sectional view of bearings of the power generator according to the first embodiment of the present invention.

As shown in FIG. 3, a first ball bearing 35 and a second ball bearing 36 are previously mounted on the rotating shaft 33. Thus, movement of the rotating shaft 33 in a direction X can be more regulated as compared with a case where the rotating shaft 33 has only one bearing. The first ball bearing 35 is constituted of an inner race 35$a$, an outer race 35$b$ and balls 35$c$. The second ball bearing 36 is constituted of an inner race 36$a$, an outer race 36$b$ and balls 36$c$. A collar 37 is provided between the first and second ball bearings 35 and 36, to keep the first and second ball bearings 35 and 36 at a prescribed interval. The first and second ball bearings 35 and 36 are examples of the "rotating shaft support portion" or the "first bearing" in the present invention.

The rotating shaft 33 is so formed that a diameter D1 along arrow Z2 is larger than a diameter D2 along arrow Z1. The inner diameter of the first and second ball bearings 35 and 36 is equal to D2. Thus, a step 33$a$ on the boundary between the portions of the rotating shaft 33 having the diameters D1 and D2 respectively regulates movement of the first and second ball bearings 35 and 36 along arrow Z2. Further, the bearing nut 38 is meshed with the rotating shaft 33, to regulate movement of the first and second ball bearings 35 and 36 along arrow Z1.

According to the first embodiment, the step 33$a$ of the rotating shaft 33 and the bearing nut 38 hold the first and second ball bearings 35 and 36 and the collar 37 therebetween, whereby the inner race 35$a$ of the first ball bearing 35 is stressed along arrow Z1. The outer race 35$b$ of the first ball bearing 35 is stressed along arrow Z2, oppositely to the inner race 35$a$. The inner race 36$a$ of the second ball bearing 36 is also stressed along arrow Z2. The outer race 36$b$ of the second ball bearing 36 is stressed along arrow Z1, oppositely to the inner race 36$a$. Thus, force is applied to points A and B of the balls 35$c$. Further, force is applied to points C and D of the balls 36$c$. The rotating shaft 33 is so formed as to remove a backlash between the first and second ball bearings 35 and 36 by stressing the inner races 35$a$ and 36$a$ and the outer races 35$b$ and 36$b$ in the aforementioned manner.

Figure 2:
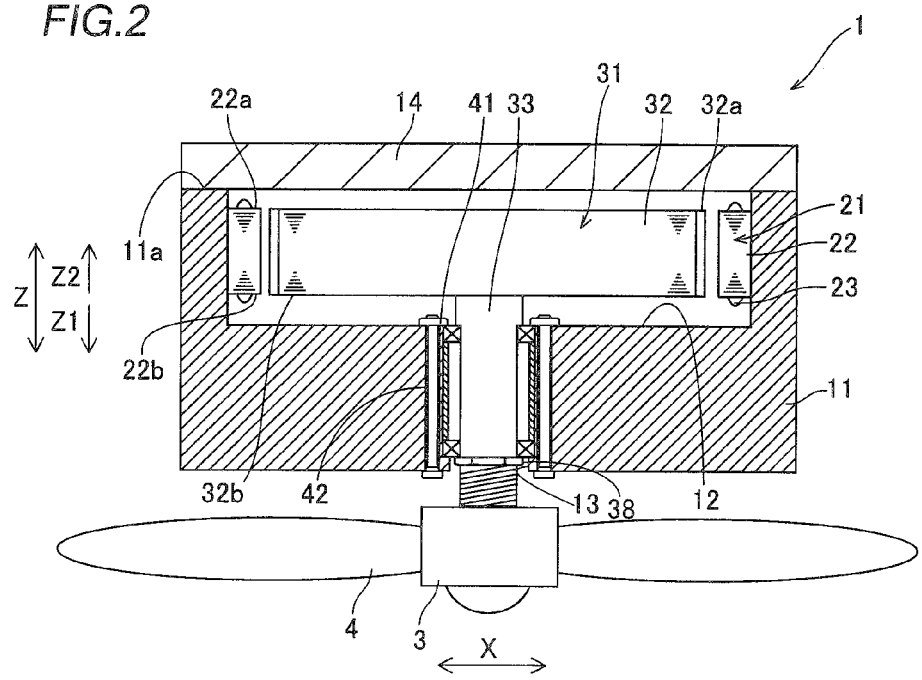
FIG. 2 is a sectional view of a power generator of the wind power generation system according to the first embodiment of the present invention.

As shown in FIG. 2, bearing caps 41 having screw portions are provided on the inner bottom surface of the recess portion 12 of the housing 11. The screws 42 are so meshed with the screw portions of the bearing caps 41 as to fix the first and second ball bearings 35 and 36 to the recess portion 12 of the housing 11.

According to the first embodiment, the power generator 1 is so formed that the length L1 in the extensional direction (direction Z) of the rotating shaft 33 from an end portion 32$b$ of the rotor core 32 closer to the rotating shaft support hole 13 (along arrow Z1) to a portion (an end portion 36$d$ of the second ball bearing 36 along arrow Z1) where the second ball bearing 36 first comes into contact with the rotating shaft support hole 13 when the rotating shaft 33 is inserted into the rotating shaft support hole 13 is larger than the length L2 (L1>L2) in the extensional direction (direction Z) of the rotating shaft 33 from an end portion 13b of the rotating shaft support hole 13 closer to the stator 21 to an end portion 22a of the stator core 22 opposite to the rotating shaft support hole 13 (along arrow Z2), as shown in FIG. 4. In other words, the power generator 1 is so formed that the length L1 in the direction Z from the end portion 32b of the rotor core 32 closer to the rotating shaft support hole 13 to the end portion 36d of the second ball bearing 36 along arrow Z1 is larger than the sum (L1>L3+L4) of the length L3 in the direction Z from the end portion 13b of the rotating shaft support hole 13 closer to the stator 21 to the end portion 22b of the stator core 22 closer to the rotating shaft support hole 13 and the length L4 (thickness) of the stator core 22 in the direction Z.

According to the first embodiment, further, the power generator 1 is so formed that the length L1 in the direction Z from the end portion 32b of the rotor core 32 closer to the rotating shaft support hole 13 to the end portion 36d of the second ball bearing 36 along arrow Z1 is larger than the length L5 (L1>L5) in the direction Z from the end portion 13b of the rotating shaft support hole 13 closer to the stator 21 to an end portion 11a of the housing 11 opposite to the rotating shaft support hole 13 (along arrow Z2).

An assembly method (manufacturing method) for mounting the rotor 31 on the housing 11 is now described with reference to FIGS. 4 to 7.

As shown in FIG. 4, the rotor 31 is arranged on a side of the housing 11 along arrow Z2 manually or with a crane or the like. In this case, the rotor 31 is so arranged on the side of the housing 11 along arrow Z2 that radial centerlines C2 and C1 of the rotating shaft 33 and the rotating shaft support hole 13 of the housing 11 substantially align with each other. At this time, the bearing caps 41 are tentatively fixed to the surface of the first ball bearing 35 along arrow Z2.

Figure 5:
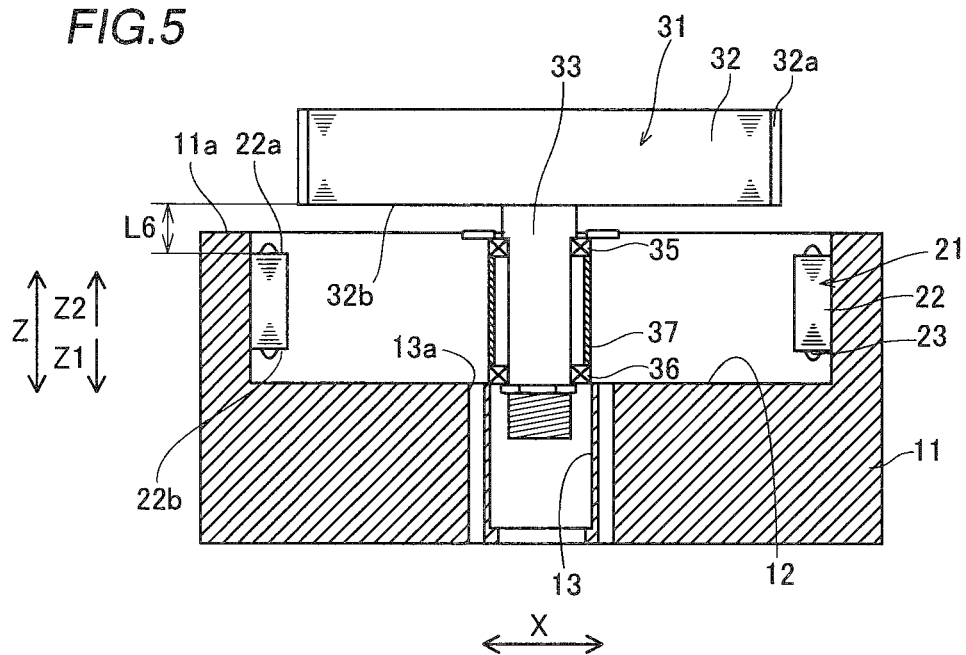
FIG. 5 illustrates a state where the rotor of the power generator according to the first embodiment of the present invention is in contact with the housing.

Then, the end portion 36d of the second ball bearing 36 along arrow Z1 and the end portion 13b of the rotating shaft support hole 13 closer to the stator 21 (along arrow Z2) are brought into contact with each other, as shown in FIG. 5. The length L1 in the direction Z from the end portion 32b of the rotor core 32 closer to the rotating shaft support hole 13 to the end portion 36d of the second ball bearing 36 along arrow Z1 is larger than the length L2 (L1>L2 (see FIG. 4)) in the direction Z from the end portion 13b of the rotating shaft support hole 13 closer to the stator 21 to the end portion 22a of the stator core 22 along arrow Z2, and hence the rotor core 32 and the stator core 22 are not opposed to each other in the radial direction (direction X) at this time. Thus, the rotor core 32 and the stator core 22 do not attract each other and come into contact with each other due to the magnetic force of the permanent magnet 32a. While the length (interval) L6 in the direction Z from the end portion 32b of the rotor core 32 closer to the rotating shaft support hole 13 to the end portion 22a of the stator core 22 along arrow Z2 is set in response to the size of the rotor core 32 (strength of the magnetic force of the rotor core 32) to be at least about 5 mm and not more than about 10 mm, for example, if the rotor core 32 is relatively small, or to be at least about 30 mm and not more than about 40 mm, for example, if the rotor core 32 is relatively large in the state shown in FIG. 5, the present invention is not restricted to the illustrated values.

Figure 6:
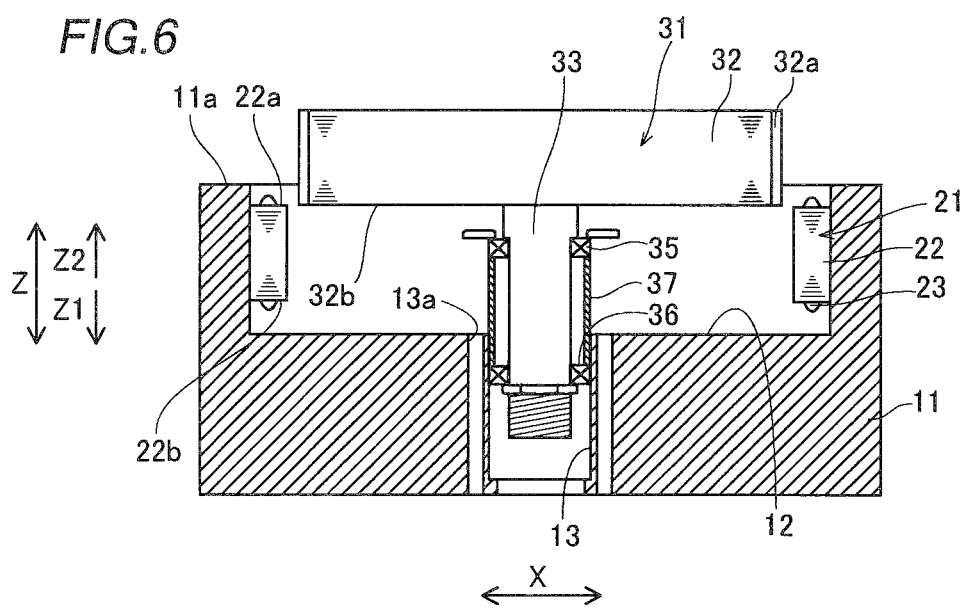
FIG. 6 illustrates a state where the rotor of the power generator according to the first embodiment of the present invention is inserted into a rotating shaft support hole of the housing.

Then, the rotating shaft 33 (first and second ball bearings 35 and 36) is inserted into the rotating shaft support hole 13 serving as a guide while the rotor core 32 and the stator core 22 are kept not in contact with each other, as shown in FIG. 6. When the end portion 36d of the second ball bearing 36 is inserted into the rotating shaft support hole 13, the rotating shaft support hole 13 regulates movement of the rotating shaft 33 in the direction X (radial direction). When the end portion 32b of the rotor core 32 along arrow Z1 is flush with the end portion 22a of the stator core 22 along arrow Z2 as shown in FIG. 6, the second ball bearing 36 is completely fitted into the rotating shaft support hole 13, and hence the rotating shaft support hole 13 completely regulates radial movement of the rotating shaft 33. Thus, the rotor core 32 and the stator core 22 are inhibited from attracting each other and coming into contact with each other due to the magnetic force of the permanent magnet 32a when the rotating shaft 33 is inserted into the rotating shaft support hole 13. Then, the rotating shaft 33 is inserted into the rotating shaft support hole 13 until the first ball bearing 35 is completely fitted into the rotating shaft support hole 13 serving as a guide while the rotor core 32 and the stator core 22 are kept not in contact with each other, as shown in FIG. 7. Thereafter the bearing caps 41 and the screws 42 are meshed with each other. Thus, the first and second ball bearings 35 and 36 are fixed to the rotating shaft support hole 13, whereby the rotor 31 is rotatably fixed to the recess portion 12 of the housing 11. Thereafter the lid portion 14 is mounted on the housing 11 as shown in FIG. 2, whereby the power generator 1 according to the first embodiment is completely assembled.

According to the first embodiment, as hereinabove described, the length L1 in the extensional direction (direction Z) of the rotating shaft 33 from the end portion 32b of the rotor core 32 closer to the rotating shaft support hole 13 (along arrow Z1) to the end portion 36d of the second ball bearing 36 along arrow Z1 is rendered larger than the length L2 (L1>L2) in the extensional direction (direction Z) of the rotating shaft 33 from the end portion 13b of the rotating shaft support hole 13 closer to the stator 21 to the end portion 22a of the stator core 22 opposite to the rotating shaft support hole 13 (along arrow Z2). When the second ball bearing 36 first comes into contact with the rotating shaft support hole 13, therefore, the rotor core 32 and the stator core 22 are not radially opposed to each other. Thereafter the rotating shaft 33 is inserted into the rotating shaft support hole 13 serving as a guide, so that the rotating shaft support hole 13 inhibits the rotor core 32 from moving toward the stator core 22 due to the magnetic force of the permanent magnet 32a included therein when the rotor core 32 and the stator core 22 are radially opposed to each other. Consequently, the rotor 31 and the stator core 22 are inhibited from attracting each other and coming into contact with each other due to the magnetic force, whereby the power generator 1 can be easily and quickly assembled. Further, the rotor 31 and the stator core 22 can be inhibited from attracting each other and coming into contact with each other due to the magnetic force by simply adjusting the length of the rotating shaft 33 etc. to have the aforementioned length relation, whereby no dedicated jig may be employed for fixing the rotor 31 to inhibit the same from moving. Also in this point, the power generator 1 can be easily and quickly assembled.

According to the first embodiment, as hereinabove described, the rotating shaft support hole 13 rotatably supports the rotating shaft 33 in a cantilever manner. Thus, the rotating shaft 33 is so provided only on one side that the power generator 1 can be reduced in axial size (reduced in thickness and miniaturized), dissimilarly to a case of providing bearings on both end portions of the rotating shaft 33 for supporting the rotating shaft 33 in an inboard-rotor manner. Consequently, the weight of the power generator 1 can be reduced. Further, the bearings 35 and 36 are provided only on one side, whereby the number of components constituting the power generator 1 can be reduced. In addition, the power generator 1 is so reduced in thickness, size and weight that the same can be easily mounted on the wind power generation system 100 and can also be easily detached from the power generation system 100 to be put down onto the ground. Consequently, the wind power generation system 1 can be easily maintained.

According to the first embodiment, as hereinabove described, the power generator 1 is so formed that the length L1 in the extensional direction of the rotating shaft 33 from the end portion 32b of the rotor core 32 closer to the rotating shaft support hole 13 to the portion where the second ball bearing 36 first comes into contact with the rotating shaft support hole 13 when the second ball bearing 36 is inserted into the rotating shaft support hole 13 is larger than the sum of the length L3 in the extensional direction of the rotating shaft 33 from the end portion 13b of the rotating shaft support hole 13 closer to the stator 21 to the end portion 22b of the stator core 22 closer to the rotating shaft support hole 13 and the length L4 of the stator core 22 in the extensional direction of the rotating shaft 33. Thus, the rotor core 32 and the stator core 22 can be rendered not radially opposed to each other when the second ball bearing 36 first comes into contact with the rotating shaft support hole 13.

According to the first embodiment, as hereinabove described, the power generator 1 is so formed that the length L1 in the extensional direction of the rotating shaft 33 from the end portion 32b of the rotor core 32 closer to the rotating shaft support hole 13 to the portion where the second ball bearing 36 first comes into contact with the rotating shaft support hole 13 when the second ball bearing 36 is inserted into the rotating shaft support hole 13 is larger than the length L5 in the extensional direction of the rotating shaft 33 from the end portion 13b of the rotating shaft support hole 13 closer to the stator 21 to the end portion 11a of the housing 11 opposite to the rotating shaft support hole 13. Thus, the distance between the rotor core 32 and the stator core 22 in the direction Z can be further increased in the state where the end portion 36d of the second ball bearing 36 along arrow Z1 and the end portion 13b of the rotating shaft support hole 13 closer to the stator 21 (along arrow Z2) are in contact with each other, whereby the rotor core 32 and the stator core 22 can be further inhibited from coming into contact with each other due to the magnetic force of the permanent magnet 32a.

According to the first embodiment, as hereinabove described, the power generator 1 is so formed that the inner race 35a and the outer race 35b of the first ball bearing 35 are oppositely stressed along the extensional direction of the rotating shaft 33 respectively. Further, the power generator 1 is so formed that the inner race 36a and the outer race 36b of the second ball bearing 36 are oppositely stressed along the extensional direction of the rotating shaft 33 respectively. Thus, force is applied to the balls 35c (36c) of the first ball bearing 35 (second ball bearing 36) from two sides in the axial direction respectively, whereby a backlash between the first and second ball bearings 35 and 36 can be eliminated. Consequently, movement of the rotating shaft 33 in the axial direction (direction Z) can be regulated.

Second Embodiment

A power generator 1a according to a second embodiment of the present invention is now described with reference to FIGS. 8 and 9. In the power generator 1a according to the second embodiment, a first ball bearing 55 and a second ball bearing 56 are previously mounted on a rotating shaft support hole 53, dissimilarly to the power generator 1 according to the aforementioned first embodiment having the first and second ball bearings 35 and 36 previously mounted on the rotating shaft 33. The overall structure of a wind power generation system according to the second embodiment is similar to that of the wind power generation system 100 according to the aforementioned first embodiment (see FIG. 1).

Figure 9:
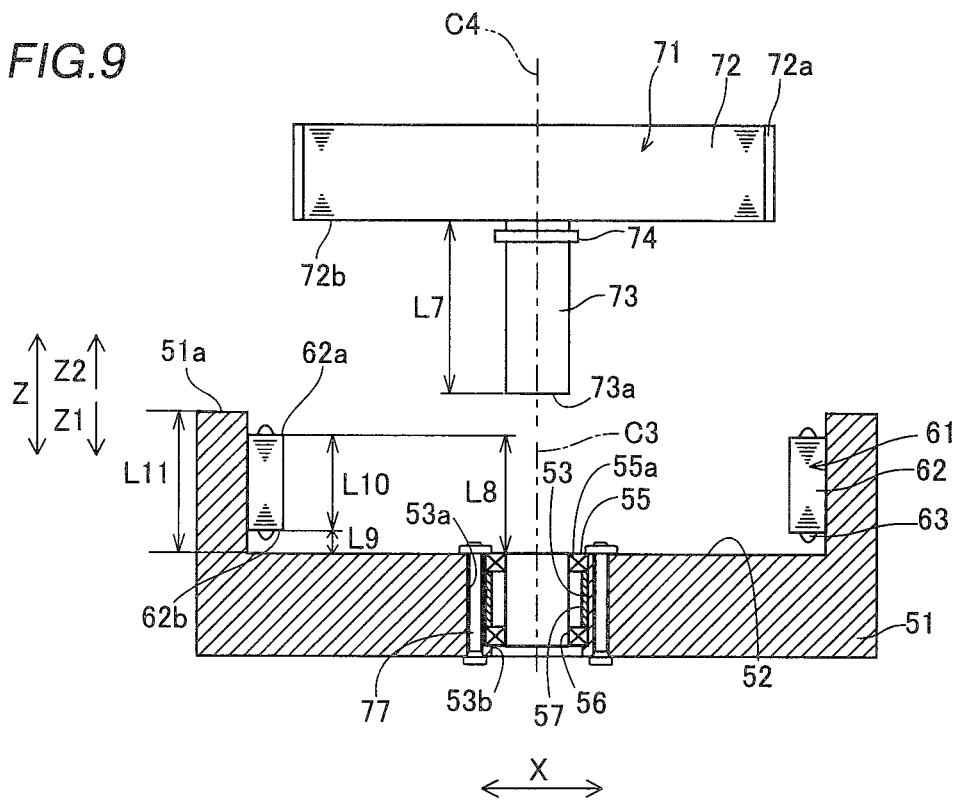
FIG. 9 illustrates a state before a rotor of the power generator according to the second embodiment of the present invention is mounted on a housing.

As shown in FIG. 9, the power generator 1a according to the second embodiment is constituted of a housing 51, a stator 61 and a rotor 71. The housing 51 is in the shape of a column. Further, the housing 51 is provided with a recess portion 52 storing the stator 61 and the rotor 71. The rotating shaft support hole 53 for receiving a rotating shaft 73 of the rotor 71 is provided on the bottom surface of the recess portion 52. A lid portion 54 (see FIG. 8) is provided to cover the recess portion 52 of the housing 51. The rotating shaft support hole 53 is an example of the "rotating shaft support portion" or the "second rotating shaft support hole" in the present invention.

The stator 61 is constituted of a stator core 62 and a winding assembly 63. The stator core 62 is made of a silicon steel lamination, for example. Further, the stator core 62 is provided with a plurality of slots (not shown). The winding assembly 63 is stored in the slots of the stator core 62. The winding assembly 63 is constituted of a plurality of windings capable of passing three-phase currents of U-, V- and W-phases, for example.

The rotor 71 includes a rotor core 72 and the rotating shaft 73. The rotor core 72 is formed by a silicon steel lamination or the like in the shape of a flat column, and connected to the rotating shaft 73. A permanent magnet 72a is provided on the outer peripheral portion of the rotor core 72. The rotating shaft 73 is provided to project and extend only on the side of the rotor core 72 closer to the rotating shaft support hole 53 (along arrow Z1) of the stator 61. Thus, according to the second embodiment, the rotating shaft support hole 53 of the stator 61 rotatably supports the rotating shaft 73 in a cantilever manner. The rotating shaft 73 is provided on a side closer to the rotor core 72 (along arrow Z2) with a stopper 74 formed by a C- or E-ring for regulating movement of the rotating shaft 73 along arrow Z1. The rotating shaft 73 is an example of the "rotating shaft portion" or the "second rotating shaft" in the present invention.

The first and second ball bearings 55 and 56 are previously mounted on the rotating shaft support hole 53 of the housing 51 by press fitting, for example. The first and second ball bearings 55 and 56 are examples of the "rotating shaft support portion" or the "second bearing" in the present invention. A collar 57 is provided between the first and second ball bearings 55 and 56, to keep the first and second ball bearings 55 and 56 at a prescribed interval. The first and second ball bearings 55 and 56 are similar in structure to the first and second ball bearings 35 and 36 (see FIG. 3) of the power generator 1 according to the aforementioned first embodiment. The first ball bearing 55, the collar 57 and the second ball bearing 56 are fixed to the recess portion 52 by inserting screws 77 into screw receiving holes 53a provided on the recess portion 52 and meshing the same with bearing caps 76.

As shown in FIG. 8, the rotating shaft 73 is provided on the forward end side (along arrow Z1) thereof with another stopper 75 formed by a C- or E-ring. The stopper 75 inhibits the rotating shaft 73 from moving along arrow Z2. The stopper 75 may alternatively be formed by another member such as a bearing nut or a bearing cap, for example.

According to the second embodiment, the power generator 1a is so formed that the length L7 in the extensional direction (direction Z) of the rotating shaft 73 from an end portion 72b of the rotor core 72 closer to the rotating shaft support hole 53 to a portion (a forward end 73a of the rotating shaft 73 along arrow Z1) where the rotating shaft 73 first comes into contact with the first ball bearing 55 when inserted into the first ball bearing 55 is larger than the length L8 (L7>L8) in the extensional direction (direction Z) of the rotating shaft 73 from an end portion 55a of the first ball bearing 55 closer to the stator 61 to an end portion 62a of the stator core 62 opposite to the first ball bearing 55 (along arrow Z2), as shown in FIG. 9. In other words, the power generator 1a is so formed that the length L7 in the direction Z from the end portion 72b of the rotor core 72 closer to the first ball bearing 55 to the forward end 73a of the rotating shaft 73 along arrow Z1 is larger than the sum (L7>L9+L10) of the length L9 in the direction Z from the end portion 55a of the first ball bearing 55 closer to the stator 61 to the end portion 62b of the stator core 62 closer to the first ball bearing 55 and the length (thickness) L10 of the stator core 62 in the direction Z.

According to the second embodiment, the power generator 1a is so formed that the length L7 in the direction Z from the end portion 72b of the rotor core 72 closer to the rotating shaft support hole 53 to the forward end 73a of the rotating shaft 73 along arrow Z1 is larger than the length L11 (L7>L11) in the direction Z from the end portion 55a of the first ball bearing 55 closer to the stator 61 to an end portion 51a of the housing 51 opposite to the first ball bearing 55 (along arrow Z2).

An assembly method (manufacturing method) for mounting the rotor 71 on the housing 51 is now described with reference to FIGS. 9 to 12.

As shown in FIG. 9, the rotor 71 is arranged on a side of the housing 51 along arrow Z2 manually or with a crane or the like. At this time, the rotor 71 is so arranged on the side of the housing 51 along arrow Z2 that radial centerlines C4 and C3 of the rotating shaft 73 and the first ball bearing 55 of the housing 51 substantially align with each other.

Figure 10:
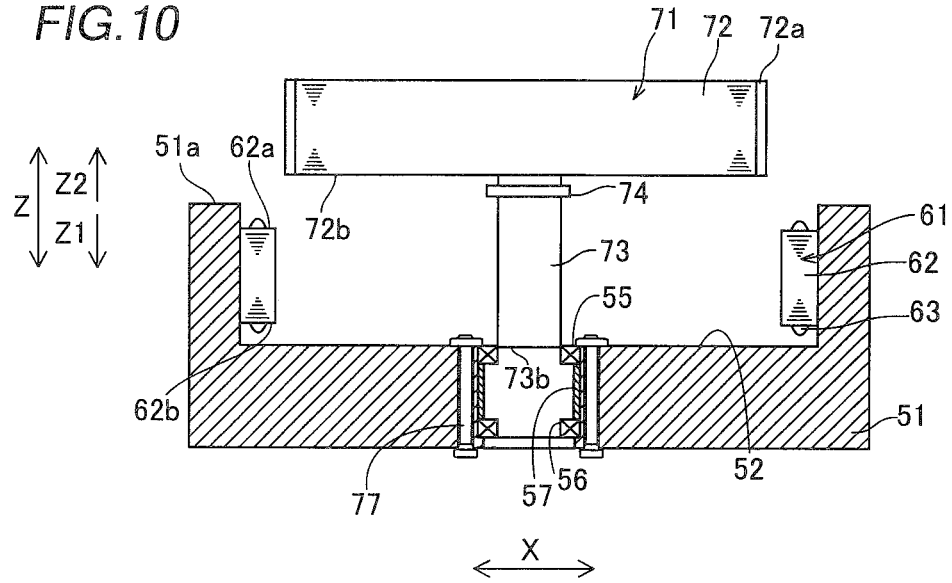
FIG. 10 illustrates a state where the rotor of the power generator according to the second embodiment of the present invention is in contact with the housing.

Then, the forward end 73a of the rotating shaft 73 along arrow Z1 and the end portion 55a of the first ball bearing 55 closer to the stator 61 (along arrow Z2) are brought into contact with each other, as shown in FIG. 10. The length L7 in the direction Z from the end portion 72b of the rotor core 72 closer to the first ball bearing 55 to the forward end 73a of the rotating shaft 73 along arrow Z1 is larger than the length L8 (L7>L8 (see FIG. 9)) in the direction Z from the end portion 55a of the first ball bearing 55 closer to the stator 61 to the end portion 62a of the stator core 62 along arrow Z2, and hence the rotor core 72 and the stator core 62 are not opposed to each other in the radial direction (direction X) at this time. Thus, the rotor core 72 and the stator core 62 do not attract each other and come into contact with each other due to the magnetic force of the permanent magnet 72a.

Figure 11:
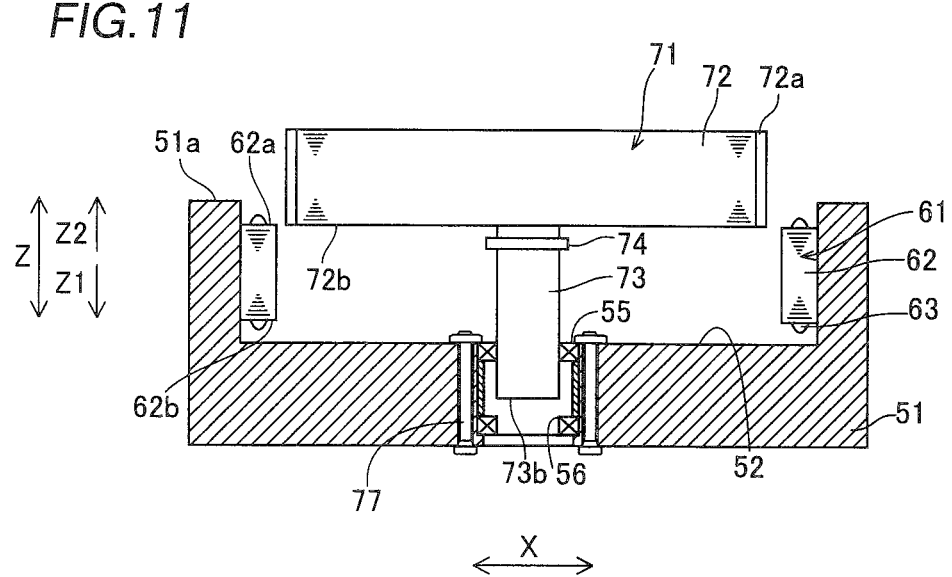
FIG. 11 illustrates a state where the rotor of the power generator according to the second embodiment of the present invention is inserted into a bearing of the housing.
Figure 12:
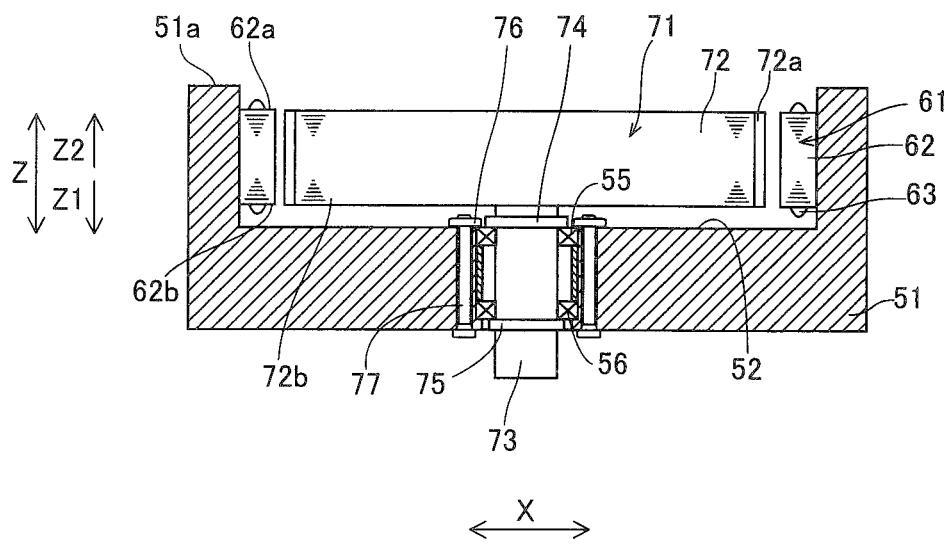
FIG. 12 illustrates a state where the rotor of the power generator according to the second embodiment of the present invention is mounted on the housing.

Then, the rotating shaft 73 is inserted into the first ball bearing 55 serving as a guide while the rotor core 72 and the stator core 62 are kept not in contact with each other, as shown in FIG. 11. When the rotating shaft 73 is inserted into the first ball bearing 55, the first ball bearing 55 regulates movement of the rotating shaft 73 in the direction X (radial direction). When the end portion 72b of the rotor core 72 along arrow Z1 is flush with the end portion 62a of the stator core 62 along arrow Z2 as shown in FIG. 11, the rotating shaft 73 is completely fitted into the first ball bearing 55, and hence the first ball bearing 55 completely regulates radial movement of the rotating shaft 73. Thus, the rotor core 72 and the stator core 62 are inhibited from attracting each other and coming into contact with each other due to the magnetic force of the permanent magnet 72a when the rotating shaft 73 is inserted into the first ball bearing 55. Then, the rotating shaft 73 is inserted into the second ball bearing 56 until the same is completely fitted into the second ball bearing 56 along the first ball bearing 55 serving as a guide while the rotor core 72 and the stator core 62 are kept not in contact with each other, as shown in FIG. 12. Thereafter the stopper 75 is mounted on the rotating shaft 73. Thus, the rotor 71 is fixed to the recess portion 52 of the housing 51. Thereafter the lid portion 54 is mounted on the housing 51 as shown in FIG. 8, whereby the power generator 1a according to the second embodiment is completely assembled.

According to the second embodiment, as hereinabove described, the length L7 in the direction Z from the end portion 72b of the rotor core 72 closer to the first ball bearing 55 to the forward end 73a of the rotating shaft 73 along arrow Z1 is rendered larger than the length L8 (L7>L8) in the direction Z from the end portion 55a of the first ball bearing 55 closer to the stator 61 to the end portion 62a of the stator core 62 along arrow Z2. When the rotating shaft 73 first comes into contact with the first ball bearing 55, therefore, the rotor core 72 and the stator core 62 are not radially opposed to each other. Thereafter the rotating shaft 73 is inserted into the second ball bearing 56 along the first ball bearing 55 serving as a guide, whereby the first and second ball bearings 55 and 56 inhibit the rotor core 72 from moving toward the stator core 62 due to the magnetic force of the permanent magnet 72a included therein when the rotor core 72 and the stator core 62 are radially opposed to each other. Consequently, the rotor 71 and the stator core 62 can be inhibited from attracting each other and coming into contact with each other due to the magnetic force, whereby the power generator 1a can be easily and quickly assembled. Further, the rotor 71 and the stator core 62 can be inhibited from attracting each other and coming into contact with each other due to the magnetic force by simply adjusting the length of the rotating shaft 73 etc. to have the aforementioned length relation, whereby no dedicated jig may be employed for fixing the rotor 71 to inhibit the same from moving. Also in this point, the power generator 1a can be easily and quickly assembled.

The remaining effects of the second embodiment are similar to those of the aforementioned first embodiment.

Although the present invention has been described and illustrated in detail, it is clearly understood that the same is by way of illustration and example only and is not to be taken by way of limitation, the spirit and scope of the present invention being limited only by the terms of the appended claims.

For example, while the rotating electric machine according to the present invention is applied to the power generator in each of the aforementioned first and second embodiments, the present invention is not restricted to this. The rotating electric machine according to the present invention may alternatively be applied to a motor, for example.

While the present invention is applied to the power generator of the wind power generation system in each of the aforementioned first and second embodiments, the present invention is not restricted to this. The present invention may alternatively be applied to a power generator of a system other than the wind power generation system, for example.

Figure 13:
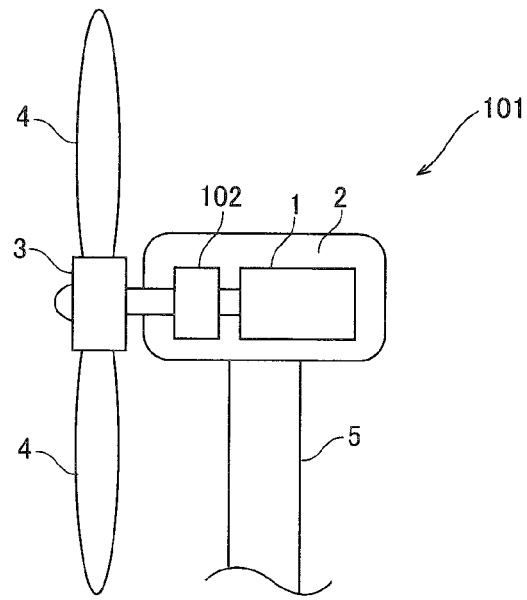
FIG. 13 illustrates the overall structure of a wind power generation system according to a modification of the first or second embodiment of the present invention.

While the rotor hub is mounted on the rotating shaft of the power generator in each of the aforementioned first and second embodiments, the present invention is not restricted to this. A gear 102 may alternatively be provided between a rotor hub 3 and a power generator 1, as in a wind power generation system 101 according to a modification of the first or second embodiment shown in FIG. 13, for example.

Figure 14:
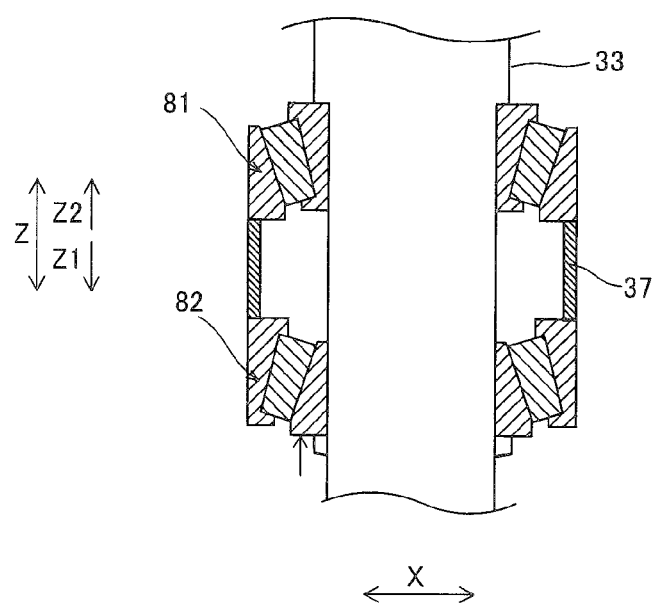
FIG. 14 is a sectional view of a bearing of a wind power generation system according to another modification of the first or second embodiment of the present invention.

While the bearings are constituted of the ball bearings in each of the aforementioned first and second embodiments, the present invention is not restricted to this. The bearings may alternatively be constituted of a first conical bearing 81 and a second conical bearing 82 as shown in FIG. 14, for example. The first and second conical bearings 81 and 82 are examples of the "rotating shaft portion" or the "first bearing" in the present invention.

Figure 15:
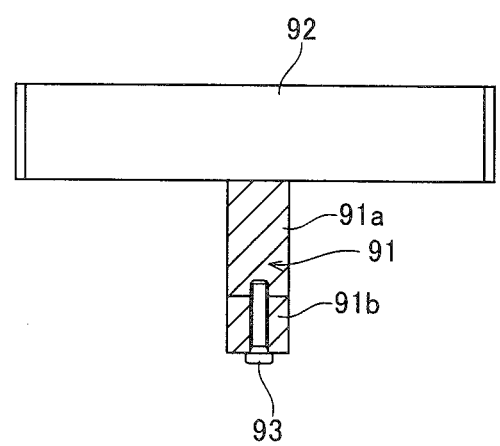
FIG. 15 is a sectional view of a rotating shaft of a power generator according to still another modification of the second embodiment of the present invention.

While the rotating shaft is constituted of an integral rotating shaft in each of the aforementioned first and second embodiments, the present invention is not restricted to this. A rotating shaft 91 may alternatively be constituted of a first portion 91a connected to a rotor core 92 and a second portion 91b bonded to the first portion 91a with a bolt 93 as shown in FIG. 15, for example. Thus, the length of the rotating shaft 91 can be easily adjusted by adjusting the length of the second portion 91b. Consequently, the length of the rotating shaft 91 can be easily adjusted so that the rotating shaft 91 can be inserted into a hole portion while the rotor core 92 and a stator core are not radially opposed to each other, in response to the sizes of a housing of a power generator, a stator, a rotor and the like. The rotating shaft 91 is an example of the "rotating shaft portion" or the "second rotating shaft" in the present invention.

While the rotating shaft is rotatably supported in a cantilever manner in each of the aforementioned first and second embodiments, the present invention is not restricted to this. The present invention is also applicable to a case where a rotating shaft is rotatably supported in an inboard-rotor manner.

While the present invention is applied to an inner-rotor type power generator having the rotor arranged inside the stator in each of the aforementioned first and second embodiments, the present invention is not restricted to this. The present invention is also applicable to an outer-rotor type power generator having a rotor arranged outside a stator.

What is claimed is:

1. A rotating electric machine comprising:
a rotating shaft portion;
a rotor including a rotor core connected to said rotating shaft portion;
a stator including a stator core arranged to be radially opposed to said rotor core;
a housing provided with a recess portion storing said rotor and said stator; and
a rotating shaft support portion provided on said housing for rotatably supporting said rotating shaft portion, and so formed that the length in the extensional direction of said rotating shaft portion from an end portion of said rotor core closer to said rotating shaft support portion to a portion first coming into contact with said rotating shaft support portion when said rotating shaft portion is inserted into said rotating shaft support portion is larger than the length in the extensional direction of said rotating shaft portion from an end portion of said rotating shaft support portion closer to said stator to a first end portion of said stator core of a side opposite to a second end portion of said stator core closer to said rotating shaft support portion.

2. The rotating electric machine according to claim 1, wherein
said rotating shaft support portion rotatably supports said rotor in a cantilever manner.

3. The rotating electric machine according to claim 1, so formed that the length in the extensional direction of said rotating shaft portion from said end portion of said rotor core closer to said rotating shaft support portion to said portion first coming into contact with said rotating shaft support portion when said rotating shaft portion is inserted into said rotating shaft support portion is larger than the sum of the length in the extensional direction of said rotating shaft portion from said end portion of said rotating shaft support portion closer to said stator to another end portion of said stator core closer to said rotating shaft support portion and the length of said stator core in the extensional direction of said rotating shaft portion.

4. The rotating electric machine according to claim 1, wherein
said rotating shaft portion includes a first rotating shaft and a first bearing previously mounted on said first rotating shaft while said rotating shaft support portion includes a first rotating shaft support hole capable of receiving said first bearing, and
the rotating electric machine is so formed that the length in the extensional direction of said first rotating shaft from an end portion of said rotor core closer to said first rotating shaft support hole to an end portion of said first bearing closer to said first rotating shaft support hole is larger than the length in the extensional direction of said first rotating shaft from an end portion of said first rotating shaft support hole closer to said stator to an end portion of said stator core opposite to said first rotating shaft support hole.

5. The rotating electric machine according to claim 4, wherein
said first bearing includes a plurality of first bearings arranged along the extensional direction of said first rotating shaft, and
the rotating electric machine is so formed that the length in the extensional direction of said first rotating shaft from said end portion of said rotor core closer to said first rotating shaft support hole to an end portion of said first bearing, arranged on the side of said first rotating shaft support hole among said plurality of first bearings, closer to said first rotating shaft support hole is larger than the length in the extensional direction of said first rotating shaft from said end portion of said first rotating shaft support hole closer to said stator to said end portion of said stator core opposite to said first rotating shaft support hole.

6. The rotating electric machine according to claim 5, further comprising a first collar provided between said plurality of first bearings, wherein
said first collar keeps said plurality of first bearings at a prescribed interval.

7. The rotating electric machine according to claim 4, wherein
said first rotating shaft is so formed that the diameter of a portion of said first rotating shaft closer to said rotor core is larger than the diameter of another portion of said first rotating shaft opposite to said rotor core, and a step on the boundary between said portions of said first rotating shaft having different diameters regulates movement of said first bearing toward said rotor core.

8. The rotating electric machine according to claim 1, wherein
said rotating shaft portion includes a second rotating shaft while said rotating shaft support portion includes a second rotating shaft support hole and a second bearing previously mounted on said second rotating shaft support hole, and
the rotating electric machine is so formed that the length in the extensional direction of said second rotating shaft from an end portion of said rotor core closer to said second rotating shaft support hole to the forward end of said second rotating shaft is larger than the length in the extensional direction of said second rotating shaft from an end portion of said second bearing closer to said stator to an end portion of said stator core opposite to said second rotating shaft support hole.

9. The rotating electric machine according to claim 8, wherein said second bearing includes a plurality of second bearings arranged along the extensional direction of said second rotating shaft, and the rotating electric machine is so formed that the length in the extensional direction of said second rotating shaft from said end portion of said rotor core closer to said second rotating shaft support hole to the forward end of said second rotating shaft is larger than the length in the extensional direction of said second rotating shaft from an end portion of said second bearing, arranged on the side of said stator among said plurality of second bearings, closer to said stator to said end portion of said stator core opposite to said second rotating shaft support hole.

10. The rotating electric machine according to claim 9, further comprising a second collar provided between said plurality of second bearings, wherein said second collar keeps said plurality of second bearings at a prescribed interval.

11. The rotating electric machine according to claim 8, further comprising a stopper provided on said second rotating shaft, wherein said stopper regulates movement of said rotor core in the axial direction of said second rotating shaft.

12. The rotating electric machine according to claim 8, wherein said second rotating shaft includes a first portion connected to said rotor core and a second portion formed to be connectable to said first portion, and the rotating electric machine is so formed that the length in the extensional direction of said second rotating shaft from said end portion of said rotor core closer to said second rotating shaft support hole to the forward end of said second portion of said second rotating shaft is larger than the length in the extensional direction of said second rotating shaft from said end portion of said second bearing closer to said stator to said end portion of said stator core opposite to said second rotating shaft support hole.

13. The rotating electric machine according to claim 1, wherein said rotating shaft portion includes a bearing having an outer race and an inner race, and the rotating electric machine is so formed that said inner race and said outer race of said bearing are oppositely stressed along the extensional direction of said rotating shaft portion respectively.

14. The rotating electric machine according to claim 1, employed as a power generator for wind power generation.

15. A wind power generation system comprising:

a power generator provided with a rotating shaft portion, a rotor including a rotor core connected to said rotating shaft portion, a stator including a stator core arranged to be radially opposed to said rotor core, a housing provided with a recess portion storing said rotor and said stator and a rotating shaft support portion provided on said housing for rotatably supporting said rotating shaft portion; and a blade connected to said rotating shaft portion, and so formed that the length in the extensional direction of said rotating shaft portion from an end portion of said rotor core closer to said rotating shaft support portion to a portion first coming into contact with said rotating shaft support portion when rotating shaft portion is inserted into said rotating shaft support portion is larger than the length in the extensional direction of said rotating shaft portion from an end portion of said rotating shaft support portion closer to said stator to a first end portion of said stator core of a side opposite to a second end portion of said stator core closer to said rotating shaft support portion.

16. The wind power generation system according to claim 15, wherein said rotating shaft support portion rotatably supports said rotor in a cantilever manner.

17. The wind power generation system according to claim 15, so formed that the length in the extensional direction of said rotating shaft portion from said end portion of said rotor core closer to said rotating shaft support portion to said portion first coming into contact with said rotating shaft support portion when said rotating shaft portion is inserted into said rotating shaft support portion is larger than the sum of the length in the extensional direction of said rotating shaft portion from said end portion of said rotating shaft support portion closer to said stator to another end portion of said stator core closer to said rotating shaft support portion and the length of said stator core in the extensional direction of said rotating shaft portion.

18. A method of manufacturing a rotating electric machine comprising a rotating shaft portion, a rotor including a rotor core connected to said rotating shaft portion, a stator including a stator core arranged to be radially opposed to said rotor core, a housing provided with a recess portion storing said rotor and said stator and a rotating shaft support portion provided on said housing for rotatably supporting said rotating shaft portion, comprising the steps of:

bringing said rotating shaft portion and an end portion of said rotating shaft support portion closer to said stator into contact with each other in a state where said rotor core and said stator core are not radially opposed to each other by rendering the length in the extensional direction of said rotating shaft portion from an end portion of said rotor core closer to said rotating shaft support portion to a portion first coming into contact with said rotating shaft support portion when said rotating shaft portion is inserted into said rotating shaft support portion larger than the length in the extensional direction of said rotating shaft portion from said end portion of said rotating shaft support portion closer to said stator to a first end portion of said stator core of a side opposite to a second end portion of said stator core closer to said rotating shaft support portion; and inserting said rotating shaft portion into said rotating shaft support portion while keeping a state where said rotor core and said stator core are not in contact with each other.

19. The method of manufacturing a rotating electric machine according to claim 18, further comprising a step of fixing said stator while substantially vertically arranging the axis thereof, in advance of the step of inserting said rotating shaft portion into said rotating shaft support portion.

20. The method of manufacturing a rotating electric machine according to claim 18, wherein said rotating shaft support portion rotatably supports said rotor in a cantilever manner.

* * * * *